(12) United States Patent
Ferlitsch

(10) Patent No.: US 7,920,281 B2
(45) Date of Patent: Apr. 5, 2011

(54) IMAGING JOB MONITORING WITH REDUCED CONTENT IMAGE

(75) Inventor: Andrew Rodney Ferlitsch, Tigard, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 1077 days.

(21) Appl. No.: 10/873,013

(22) Filed: Jun. 21, 2004

(65) Prior Publication Data

US 2005/0280836 A1 Dec. 22, 2005

(51) Int. Cl.
*G06F 3/12* (2006.01)
*G06F 15/00* (2006.01)

(52) U.S. Cl. ........................................ 358/1.15; 358/1.1

(58) Field of Classification Search .................. 358/1.1, 358/1.15

See application file for complete search history.

(56) References Cited

U.S. PATENT DOCUMENTS

| 6,188,766 | B1 | 2/2001 | Kocher .......................... 380/246 |
| 6,195,462 | B1 * | 2/2001 | Bryniarski et al. ............ 382/239 |
| 6,219,151 | B1 | 4/2001 | Manglapus et al. .......... 358/1.15 |
| 6,438,574 | B1 | 8/2002 | Nagashima .................... 718/102 |
| 6,452,689 | B1 | 9/2002 | Srinivasan ................... 358/1.15 |
| 6,452,692 | B1 | 9/2002 | Yacoub ........................ 358/1.15 |
| 6,453,129 | B1 | 9/2002 | Simpson et al. ................. 399/23 |
| 7,272,258 | B2 * | 9/2007 | Berkner et al. ............... 382/176 |
| 2002/0001104 | A1 | 1/2002 | Shima ........................... 358/442 |
| 2002/0021359 | A1 | 2/2002 | Okamoto .................... 348/222.1 |
| 2002/0030850 | A1 | 3/2002 | Matsueda ..................... 358/1.15 |
| 2002/0036695 | A1 * | 3/2002 | Kawade ......................... 348/222 |
| 2002/0057449 | A1 | 5/2002 | Chapman et al. ............. 358/1.15 |
| 2002/0060801 | A1 | 5/2002 | Motamed et al. ............. 358/1.13 |
| 2002/0095508 | A1 | 7/2002 | Okazawa ....................... 709/230 |
| 2003/0231345 | A1 * | 12/2003 | Azami ......................... 358/1.18 |
| 2003/0234957 | A1 * | 12/2003 | Ohara ......................... 358/1.15 |
| 2004/0021708 | A1 * | 2/2004 | Lay et al. .......................... 347/5 |
| 2004/0021895 | A1 * | 2/2004 | Lay et al. ...................... 358/1.15 |
| 2004/0105123 | A1 * | 6/2004 | Fritz et al. ..................... 358/1.16 |
| 2004/0139164 | A1 * | 7/2004 | Kanaya ........................... 709/206 |
| 2004/0184072 | A1 * | 9/2004 | Jacobsen et al. ............. 358/1.15 |
| 2005/0038919 | A1 * | 2/2005 | Matsubara et al. ................ 710/1 |
| 2005/0052659 | A1 * | 3/2005 | Jacobsen et al. ............... 358/1.1 |
| 2007/0188539 | A1 * | 8/2007 | Saruta ............................. 347/19 |

FOREIGN PATENT DOCUMENTS

EP 0882580 9/1998
EP 0 882 580 12/1998

* cited by examiner

*Primary Examiner* — Twyler L Haskins
*Assistant Examiner* — Fred Guillermety
(74) *Attorney, Agent, or Firm* — Kirton & McConkie; Michael F. Krieger; Adam D. Stevens

(57) ABSTRACT

A reduced content image generator generates a reduced content image representing an imaging job. The reduced content image is generated from imaging data that is part of the imaging job. The reduced content image may be generated from the original imaging data or from the imaging data as processed at any step in the process of completing the imaging job. The reduced content image or a pointer to the reduced content image may be stored with other information regarding the imaging job and displayed with the other information to help identify the imaging job.

21 Claims, 4 Drawing Sheets

| | Pointer To Reduced Content Image | Name Of Imaging Job | Status Of Imaging Job | Owner Of Imaging Job | Size Of Imaging Job | Pages In Imaging Job | Time Imaging Job Generated |
|---|---|---|---|---|---|---|---|
| Imaging Job 1 | | | | | | | |
| Imaging Job 2 | | | | | | | |

IMAGING JOB MONITORING WITH REDUCED CONTENT IMAGE

BACKGROUND

Image processing is an important part of modern day computing. Image processing may include may different activities, including without limitation printing a document or a data file, scanning a physical object to create a digital representation of the object, scanning and transmitting a document via a facsimile machine, copying a document, processing a document or file, such as by converting the document or file from one format to another format, and generating and processing imaging data from other spectrums, such as X-Rays, MRI, and sonar. In a computer or other image processing system, it is common practice to collect and display information about each of the imaging jobs being processed. Such information typically takes the form of textual data that identifies each imaging job and provides a variety of information regarding the job, such as the progress status of the job, the size of the job, the owner of the job, etc. Particularly, where a number of imaging jobs are being processed, it may be difficult for a user to identify the imaging job that corresponds to the displayed information about each imaging job. The present invention generates a reduced content image of an imaging job, which may be displayed with the information about the imaging job in order to help a user distinguish one imaging job from another.

BRIEF SUMMARY

In an embodiment of the invention, a reduced content image generator generates a reduced content image representing an imaging job. The reduced content image is generated from imaging data that is part of the imaging job. The reduced content image may be generated from the original imaging data or from the imaging data as processed at any step in the process of completing the imaging job. The reduced content image or a pointer to the reduced content image may be stored with other information regarding the imaging job and displayed with the other information to help identify the imaging job.

For example, an imaging job may be a print job in which a file of data is to be printed. The print job may consist of the data to be printed and instructions for printing the data. The reduced content image of the print job may be generated from the original data and/or printing instructions or from the data and printing instructions after they have been processed. The reduced content image representing the print job or a pointer to the reduced content image may be stored with other information, such as status information, regarding the print job. The reduced content image may then be displayed with the other information about the print job to help distinguish the print job from other print jobs.

In another example, an imaging job may be a scan job in which a hard-copy document is scanned to produce scanned image data. The reduced content image of the scan job may be generated from the scanned image data after the hard-copy document is scanned, or may be produced from a low-resolution pre-scan of the hard-copy document.

In another example, an imaging job may be a fax job in which a soft or hard-copy document is to be faxed to another fax destination. The fax job may consist of the data to be rendered (e.g., viewed or printed) at the fax destination. The reduced content image of the fax job may be generated from the original data and/or fax instructions or from the rendered version of the fax job at the fax destination.

DETAILED DESCRIPTION OF EXEMPLARY EMBODIMENTS

The present invention relates generally to monitoring the status of an imaging job. Although this specification describes exemplary embodiments and applications of the invention, the invention is not limited to these exemplary embodiments and applications or to the manner in which the exemplary embodiments and applications operate or are described herein.

Figures 1, 2:
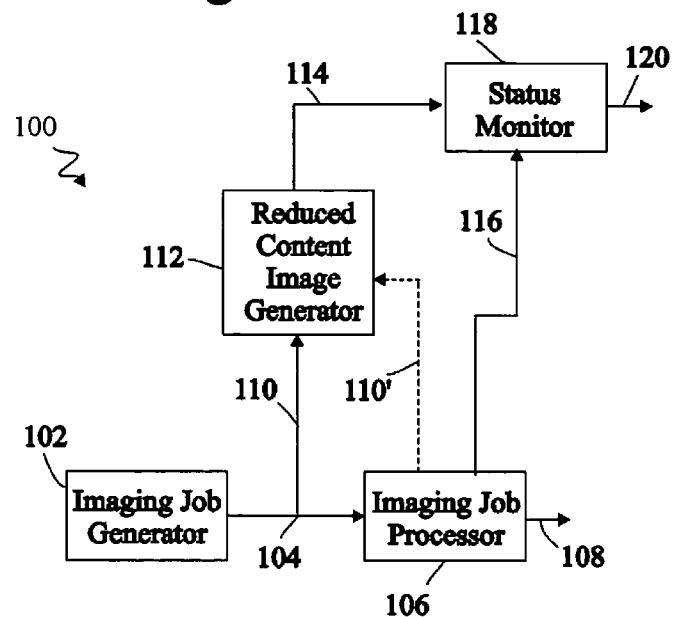
FIG. 1 illustrates a simplified block diagram of an exemplary imaging system.
FIG. 2 illustrates an exemplary display of information regarding two exemplary imaging jobs.

FIG. 1 illustrates an exemplary imaging system 100 in which an imaging job generator 102 generates an imaging job, which is processed by imaging job processor 106. Status monitor 118 receives, stores, and displays information about the imaging job, including its status. Reduced content image generator 112 generates a reduced content image representing the imaging job, which may be stored and displayed with the status information about the imaging job. The imaging job generator 102 may generate, and the imaging job processor 106 may process, many imaging jobs. Thus, the status monitor may be monitoring and displaying the status of many different and possibly changing imaging jobs. The reduced content image generated by the reduced content image generator 112 may help a user to recognize and identify each of the many imaging jobs.

Describing FIG. 1 in more detail, the imaging job generated by image job generator 102 may be any type of imaging job. For example, the imaging job may be a print job in which a document, image, or other collection of data is to be printed. As known in the field, a print job may comprise printing instructions that include both the data to be printed and a description of how the data is to be printed. As another example, the imaging job may be a scan job in which a hard copy of a document, photo, or other physical entity with information is to be scanned, converted into electronic data, and stored electronically. As yet another example, the imaging job may be an action to be performed on a document by a document management or processing system. As still another example, the imaging job may be a document or file comprising data in a first format with instructions to convert the document or file into a second format (e.g., a graphics file in a first format that is to be converted into a second format). Other examples of possible imaging jobs include, without limitation, a facsimile operation (e.g., scanning, transmitting, printing, etc.) and copying a document or other collection of physically represented data.

The imaging job generator 102 may be any device that generates such imaging jobs. For example, the imaging job generator 102 may be a print driver or print generator in a computer, a scanning subsystem of a computer, a portion of a document management system, a subsystem of a copier, a subsystem in a facsimile machine, etc. As shown in FIG. 1, the imaging job generator 102 outputs 104 the imaging job to image job processor 106, which processes or executes the imaging job and outputs 108 the results of processing the imaging job. If the imaging job is a print job, the imaging job processor 106 may be a printer or a printing system, and the output 108 of the imaging job processor 106 is printed pages. If the imaging job is a scan job, the output 108 of imaging job processor 106 may be electronically stored image data. If the imaging job processor is a subsystem in a facsimile machine, the output 108 may be the transmission of a scanned hardcopy document or other soft-copy data, or the output 108 may be the rendering of the fax job by a destination fax device.

The information 116 collected and stored by the status monitor 118 may be any information regarding the imaging job generated by imaging job generator 102 and processed by imaging job processor 106. For example, the information 116 may be status information showing progress of the job. (e.g., the status information may indicate that the job is queued for processing or that the job is in a particular stage of processing). As another example, the information 116 may be a notice that the job has completed. The foregoing are examples only and should not be taken as limiting.

As shown in FIG. 1, the reduced content image generator 112 generates the reduced content image from part or all of the imaging data generated by the imaging job generator 102 as part of the imaging job. As also shown in FIG. 1, the reduced content image generator 112 outputs 114 the reduced content image (or a pointer to the reduced content image) to the status monitor 118, where it is stored with the other information 116 regarding the imaging job. In addition, the reduced content image may be encrypted and/or compressed and then decrypted and/or decompressed before being viewed.

The reduced content image 114 may be generated from the imaging data as output 104 by the image job generator 102. That is, all or part of the image data generated by the image job generator 102 may be input 110 to the reduced content processor 112. Alternatively or in addition, the reduced content image generator 112 may receive image data from the image job processor 106. Thus, the reduced content processor 112 may alternatively or additionally, produce the reduced content image 114 from processed or partially processed image data 110'. (Note that the input 110' to reduced content image processor 112 is shown in dashed lines to indicate that it is an alternative to input 110.) As another alternative, both inputs 110 and 110' may be used. For example, a first reduced content image may be generated from the image data as output 104 by the imaging job generator 102 (input 110 to reduced content image generator 112) and stored at status monitor 118. Thereafter, as the imaging job is processed, a second reduced content image may be generated from the image data as or after it is processed by imaging job processor 106 (input 110' to reduced content image generator 112). The second reduced content image may replace the first reduced content image in status monitor 118.

For example, in an imaging job that includes printing, the reduced content image may be generated from the original print data and instructions generated by the print generator. In most printing systems, the original print data and instructions generated by the print generator are processed and changed before being sent to the printing device. The reduced content image may be generated from the changed print data and instructions at any point in the processing of the print data and instructions. Thus, for example, the reduced content image may be generated from printer ready data (e.g., PCL or Postscript data), journaled data (e.g., EMF data), printer intermediate data (e.g., Display List (DL) or bitmap), or raster image processed data.

Moreover, the reduced content image may be generated in any suitable manner. For example, the reduced content image may be a thumbnail image of part or all of the imaging data and may be generated in any manner known for generating a thumbnail image. As another example, the reduced content image may be generated by extracting only selected portions of the imaging data. For example, a reduced content image of a document to be printed may be generated by extracting only the first page to be printed and creating a thumbnail image of the first page. As another example, the reduced content image may be generated by extracting only text from all or part of the imaging data. For example, color or other data that does not provide significant information may be discarded from the reduced content image. As yet another example, if the imaging data comprises a graphic image, the reduced content image may be generated by extracting less than all of the graphics data. As another example, every one, two, or more lines may be discarded from rasterized data. The foregoing exemplary ways of creating a reduced content image are exemplary only and are not limiting.

As shown in FIG. 1, status monitor 118 may output 120 information 116 regarding the imaging job. FIG. 2 illustrates an exemplary output 120 of status monitor 118 in the form of a visual display 202 of job status information collected and maintained by status monitor 118. Information regarding two exemplary imaging jobs 204 and 206 are shown in FIG. 2. The first exemplary imaging job 204 is a print job in which a document entitled "Marketing Report" is to be printed. The second exemplary job 206 is also a print job, which is printing a file of "photos." As shown in FIG. 2, the information displayed for each imaging job 204 and 206 includes: a reduced content image representing the imaging job, which is created by reduced content image generator 112 from the imaging data generated by imaging job generator 102 as part of the imaging job; the name of the imaging job ("Marketing Report" for imaging job 204 and "Photos" for imaging job 206), the status of the imaging job ("Printed" for imaging job 204, and "Spooling" for imaging job 206), the owner of the imaging job ("Jane Doe" for imaging job 204 and "Joe Dane" for imaging job 206), the amount of data to be printed (250 kb for imaging job 204 and "2.1 Mb" for imaging job 206), the number of pages to be printed (4 pages for imaging job 204 and 1 page for imaging job 206), and the time the printing job was generated (12:51 pm for imaging job 204, and 1:04 pm for imaging job 206). Of course, more, less, and/or different status information may be stored and displayed for each imaging job 204 and 206.

Figures 3, 4:
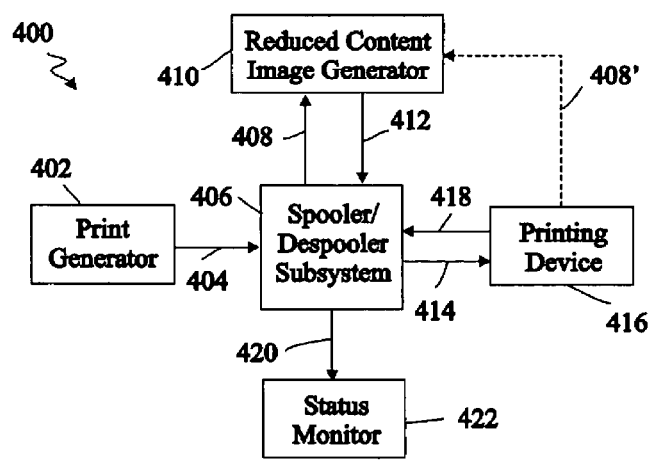
FIG. 3 illustrates an exemplary memory array for storing information regarding imaging jobs.
FIG. 4 illustrates a simplified block diagram of an exemplary computer printing system.

Status monitor 118 may include a memory for storing the information 116 about each imaging job and the reduced content image 114. FIG. 3 illustrates an exemplary array 300 for storing imaging job status information. As shown in FIG. 3, the array 300 includes a row 302 and a row 304 for each imaging job. (Although two rows 302 and 304 are shown in FIG. 3, more or fewer rows may be used.) Columns 306, 308, 310, 312, 314, 316, and 318 provide storage cells for a variety of information regarding each imaging job. In the example shown in FIG. 3, the columns include storage cells for all of the following information for each imaging job: a pointer to a reduced content image of the imaging job 306, the name or an identifier identifying the imaging job 308, the current status of the imaging job 310, the user who owns or initiated the imaging job 312, the amount of data in the imaging job 314, the number of pages in the imaging job 316, and the time the imaging job was generated 318. Again, more, less, and/or different status information regarding each imaging job may be stored in such a memory array 300.

Reduced content image generator 112 may be implemented as a microprocessor (not shown) operating under control of software stored in a digital memory (not shown) that is accessible by the microprocessor. Alternatively, reduced content image generator 112 may comprise hardwired logic or a combination of hardwired logic and software control. One or more of imaging job generator 102, imaging job processor 106, and status monitor 118 may also comprise a microprocessor operating under software control and/or hardwired logic. As yet another alternative, one or more of, or a part of one or more of, imaging job generator 102, imaging job processor 106, status monitor 118, and reduced content image generator 112 may be implemented as software operating on one microprocessor. It should also be noted that reduced content image generator 112 may output 114 the reduced content image to the imaging job processor 106, which may then output 116 the reduced content image to the status monitor with the other information about the imaging job.

FIGS. 4-8 illustrate exemplary implementations of the general imaging system 100 shown in FIG. 1.

FIG. 4 illustrates an exemplary computer print system 400 for printing data files in a computer system (not shown). In FIG. 4, print generator 402 functions as an imaging job generator, and spooler/despooler subsystem 406 and printing device 416, together, function as an imaging job processor 108. Print system 400 may be part of a personal computer or a computer system.

Print generator 402 generates and outputs 404 a print job, which may comprise data to be printed and instructions for printing the data. The print job output 404 by print generator 402 is received by a spooler/despooler subsystem 406 and queued with other print jobs for printing. Upon reaching the top of the print queue (not shown), the print job is output 414 by spooler/despooler subsystem 406 to a printing device 416, which executes the print job by printing the print job on one or more sheets of paper. Status regarding progress of the printing operation may be feed back 418 to the spooler/despooler subsystem 406.

The spooler/despooler subsystem 406 may include storage (not shown) for storing the current status of and/or other information about each of the print jobs generated by print generator 402. As one example, status information regarding a print job may be stored in the print queue (not shown), which may include a storage array similar to array 300 in FIG. 3 for storing status information about each print job. The status of a print job may be updated at any of many different possible progress points as execution of a print job takes place. For example, the initial status of a print job may indicate that the print job has been queued and is waiting to be despooled to the printing device 416. The status may thereafter be updated periodically to reflect the print job's current position in the queue. As the print job is despooled to the printing device 416 and then printed by the printing device 416, the status of the print job may be updated. For example, the status may be updated to indicate that the print job is being despooled to the printing device 416, that the print job is being printed by the printing device 416, or that the printing device 416 has completed the print job. In addition, during despooling, the status may be updated to reflect the amount of data that has been despooled. Similarly, while the printing device 416 is printing the print job, the status may be updated to show the number of pages that have been printed by the printing device 416. Additionally, the status may indicate the need for user intervention, such as loading additional paper or toner, or entering a release code such as in a confidential print mode.

The status information about each print job may be output 420 to a status monitor 422, which may display the status of one or more of the print jobs. For example, the status information for one or more print jobs may be displayed generally as shown in FIG. 2.

As shown in FIG. 4, a copy of all or part of the print data associated with the print job is output 408 from the spooler/despooler subsystem 406 to a reduced content image generator 410, which may be generally similar to reduced content image generator 112 shown in FIG. 1 and discussed above. Using any of the methods discussed above with respect to reduced content image generator 112, reduced content image generator 410 generates a reduced content image that visually depicts the print job. That reduced content image is output 412 by the reduced content image generator 410 to the spooler/despooler subsystem 406, which stores the reduced content image with the status information regarding the print job. Alternatively, the reduced content image may be stored elsewhere and the reduced content image generator 410 may output 412 to the spooler/despooler subsystem 406 a pointer to the reduced content image. In this way, status information output 420 by the spooler/despooler subsystem 406 to the status monitor 422 may include a reduced content image of the print job, which may be displayed with the status information (e.g., as shown in FIG. 2). In an alternate method, the reduced content image generator 410 outputs the reduced content image directly to the status monitor 420. Additionally, the status monitor 420 may be composed of many status monitors (not show) at different locations. For example, one status monitor may reside on a host system which contains the print generator 402, another status monitor may reside on the printing device 416, and another status monitor may reside on a server system which is used for administrating printing jobs.

The print data that is input 408 to the reduced content image generator 410 may be data from the print job extracted from any stage of the processing of the print data. For example, the print data input 408 to the reduced content image generator 410 may be extracted from the original print data output 404 by the print generator 402 before the spooler/despooler subsystem 406 has processed the print data. As other examples, the print data input 408 to the reduced content image generator 410 may be extracted from spooled print data within the depooler/despooler subsystem 406 or despooled print data output 414 to the printing device 416. As yet another example, the reduced content image may be generated by reduced content image generator 410 from data extracted (e.g., 408' in FIG. 4) from the printing device 416.

Figure 5:
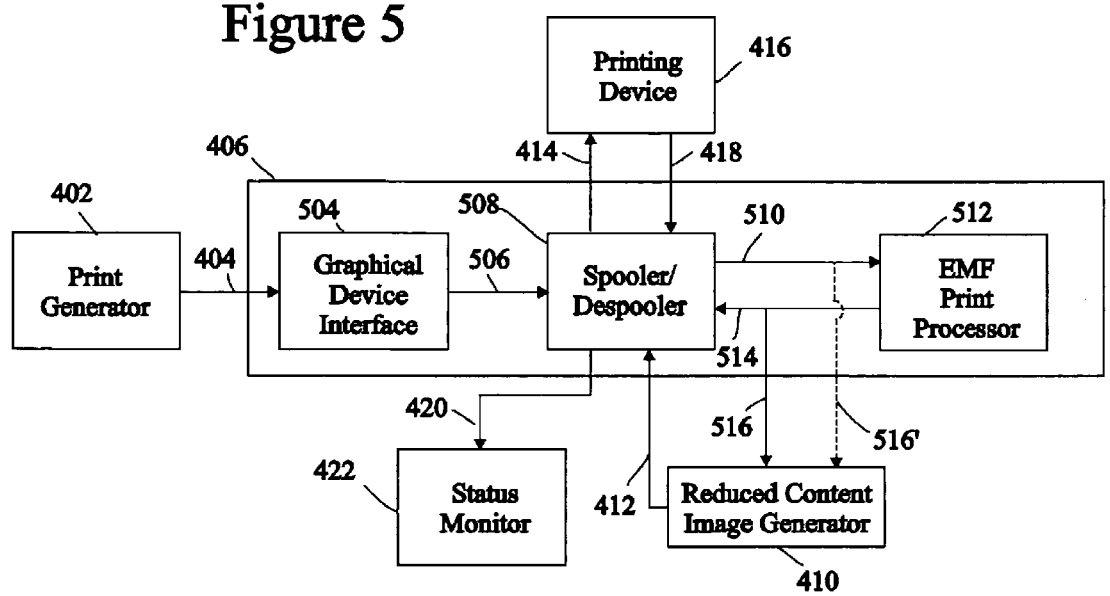
FIG. 5 illustrates the computer printing system of FIG. 4 with an exemplary configuration of the spooler/despooler subsystem 406.

FIG. 5 shows an exemplary configuration of the print system 400 of FIG. 4, and illustrates a variety of possible intermediate processing points at which the print data of a print job generated by print generator 402 may be extracted by the reduced content image generator 410 and used to generate a reduced content image. FIG. 5 is generally the same as FIG. 4 except that the spooler/despooler subsystem 406 is configured as a graphical device interface 504, a spooler/despooler 508, and an EMF print processor 512.

In FIG. 5, the print generator 402 generates a print job in the form of print instructions (e.g., print data and instructions for printing the data) that are output 404 to a graphical device interface 504, which converts the print instructions to an enhanced metafile format ("EMF") 506. Spooler/Despooler 508 queues the EMF data file for processing by an EMF print processor 512. Once the EMF data file reaches the top of the queue, the spooler/despooler 508 outputs 510 the EMF data file to the EMF print processor 512, which converts the EMF data into raw print data for the printing device 416. The raw print data 514 is output from the EMF print processor 512 back to the spooler/despooler 508, where it is again queued but this time for printing by printing device 416. Upon reaching the top of the second queue, the raw print data is output 414 by the spooler/despooler 508 to the printing device 416, which prints the data. As discussed above with respect to FIG. 4, status regarding progress of the printing is feed back 418 to the spooler/despooler, and a reduced content image generator 410 generates a reduced content image of the print job that is associated with the status information for the print job.

In the configuration shown in FIG. 5, the reduced content image generator 410 generates the reduced content image from the raw print data 514 output by the EMF print processor 512. That is, as shown in FIG. 5, all or part of the raw print data 514 generated by the EMF print processor 512 is tapped as input 516 to the reduced content image generator 410. As also shown in FIG. 5, the input 516' to the reduced content image generator 410 may alternatively extract all or part of the EMF data generated by the graphical device interface 504 and output 510 by the spooler/despooler 508 to the EMF print processor 512. (Input 516' to reduced content image generator 410 is shown in FIG. 5 as a dashed line to indicate that it is an alternative to input 516.) Of course, the EMF data could be tapped directly from the output 506 of the graphical device interface 504 or from the spooler/despooler 508 (which, as discussed above, stores the EMF data generated by graphical device interface 504 while the EMF data is queued and awaiting its turn for processing by EMF print processor 512). Although not shown in FIG. 5, the reduced content image could alternatively be generated from all of part or the print instructions 404 output by the print generator 402. The print generator 606 of FIG. 6 is an example of an imaging job generator 102, and the printer 624 of FIG. 6 is an example of an imaging job processor 106.

Figure 6:
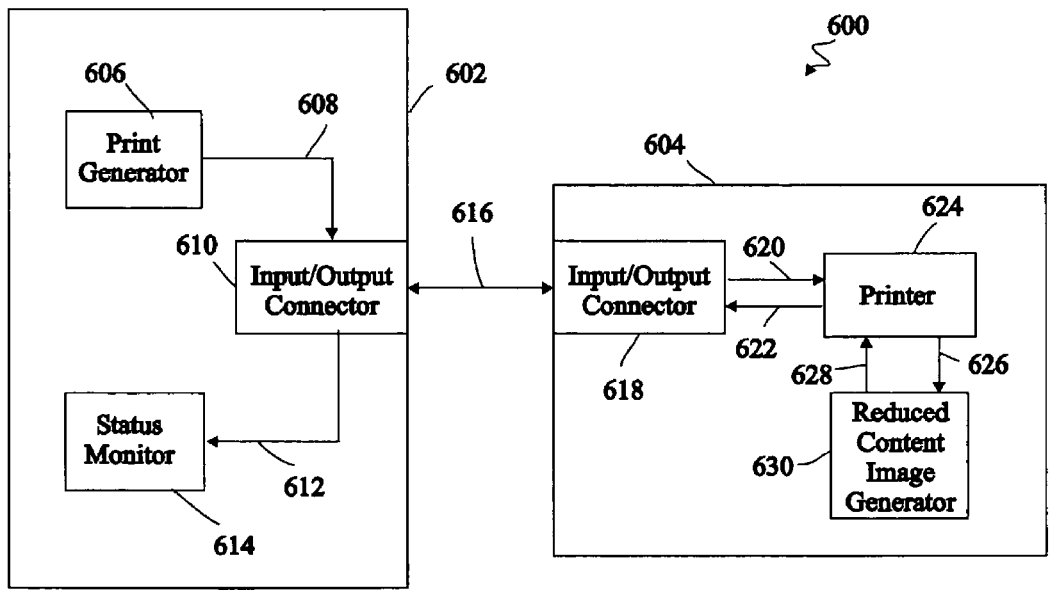
FIG. 6 illustrates a simplified block diagram of an exemplary client/server printing system.

FIG. 6 illustrates an exemplary system 600 in which a print job is generated locally 602 and printed at a remote location 604. Once the print job has been completed, the remote printer 604 returns a notice to the originator 602 of the print job indicating that the print job has been complete. As will be seen, the notice may include a reduced content image representing the print job.

The exemplary system 600 shown in FIG. 6 includes a local entity 602, such as a network client, and a remotely located printer 604, such as a network printer. (Hereinafter, the local entity 602 will be referred to as a "client" and the remote printer 604 will be referred to as a "print server.") As shown in FIG. 6, the local entity 602 includes a print generator 606 that generates print jobs and may be generally similar to print generator 402 in FIG. 4. The local entity 602 also includes a status monitor 614 for collecting and displaying the status of print jobs generated by print generator 606. Status monitor 614 may be generally similar to status monitor 422 in FIG. 4. As also shown in FIG. 6, the print server 604 includes a printer 624 and a reduced content image generator 630, which may be generally similar to, respectively, printing device 416 and reduced content image generator 410 or 112 as discussed above. Because the local entity 602 and the print server 604 are located remotely from one another, both entities include an input/output connector 610 and 618 and a data communications link 616, which may be any type of communication link including without limitation one or more interconnected computer networks, a communication cable, a wireless data link, etc. The print server 604 also includes a reduced content image generator 630, which receives all or part of the data to be printed 626, creates a reduced content image representing the print job, and outputs 628 the reduced content image to the printer 624.

The system 600 of FIG. 6 may operate as follows. The print generator 606 generates a print job, which is output 608 to input/output connector 610, and transmitted through data link 616 to the input/output connector 618 of print server 604. The print job is then input 620 to the printer 624, which prints the job. Once printing is completed, the printer 624 generates a completion notice and outputs 622 the completion notice to input/output connector 618, which transmits the completion notice through communications link 616 to the input/output connector 610 of the local entity 602. The completion notice is then input 612 to the status monitor 614, which may display an indication that the print job has been completed. The completion notice includes the reduced content image representing the print job that was generated by the reduced content image generator 630. The print generator 606, reduced content image generator 630, and status monitor 614 may operate as generally described above respect to the print generator 402, reduced content image generator 410, and status monitor 422 of FIG. 4. The printer 624 may include a spooler/despooler subsystem and a printing device like spooler/despooler subsystem 406 and printing device 416 also shown in FIG. 4 and FIG. 5 and described above.

Figure 7:
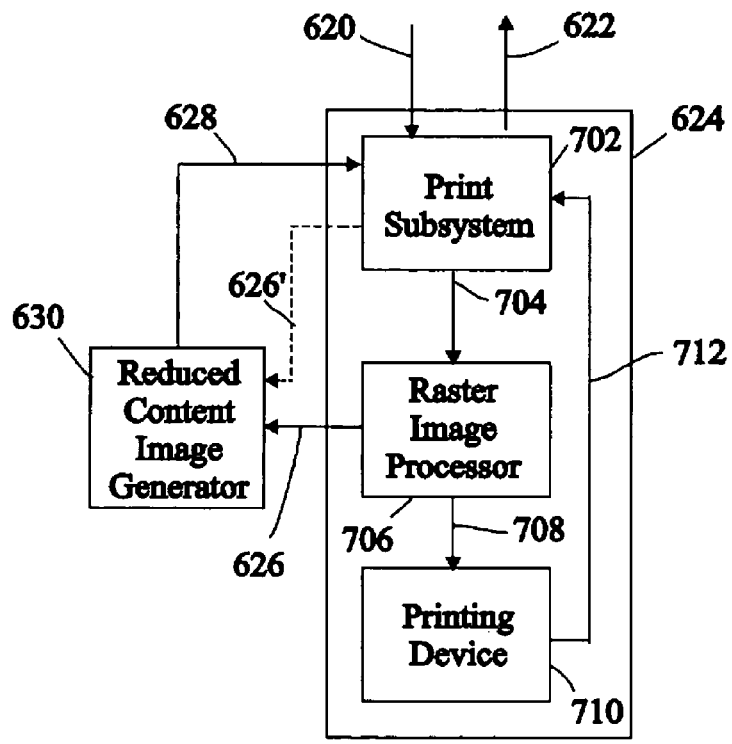
FIG. 7 illustrates an exemplary configuration of the printing device 624 of FIG. 6.

FIG. 7 shows another exemplary configuration of printer 624. As shown, the printer 624 includes a print subsystem 702 that receives the print job 620. The print subsystem 702 outputs 704 the print job to a raster image processor 706. The raster image processor 706 converts the print job into raster data, which is output 708 to a printing device 710 that prints the raster data onto pages. The printing device 710 feeds back 712 progress status to the print subsystem 702. Once the printing device 710 prints all of the raster data in the print job, the print subsystem 702 generates a completion notice as discussed above, which is output 622 for transmission with a reduced content image of the print job to the local entity 602 also as discussed above. As shown in FIG. 7, the reduced content image generator 630 may receive as input 626 and generate the reduced content image from all or a portion of the raster data generated by the raster image processor 706. As also shown in FIG. 7, alternatively, the reduced content image generator 630 may generate the reduced content image from all or part of the print job data (626') before the data is processed by the raster image processor 706. (Note that input 626' is shown in dashed lines to indicate that it is an alternative to input 626.) In another method, as the printing device 710 prints sub-portions of the raster data (e.g., individual sheets) in the print job, the print subsystem 702 generates a completion notice per sub-portion as discussed above, which is output 622 for transmission with a reduced content image of the print job to the local entity 602 also as discussed above.

Figure 8:
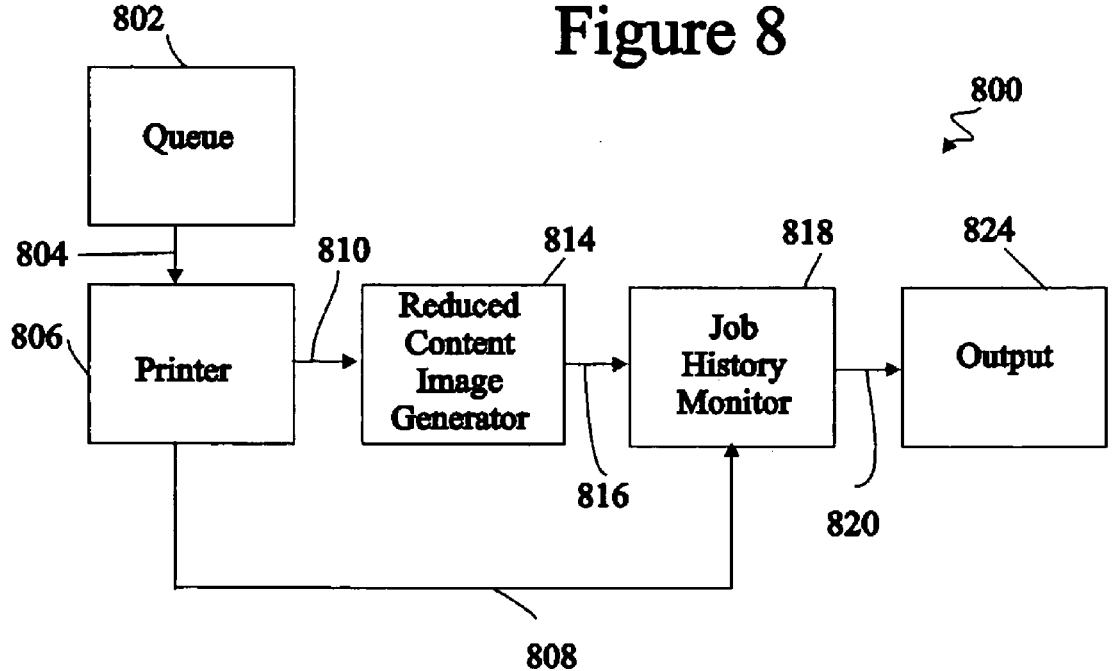
FIG. 8 illustrates an simplified block diagram of an exemplary printing system.

FIG. 8 illustrates a printing system 800 in which printing jobs are queued for printing in queue 802 and job history monitor 818 stores a history of completed jobs. Although not shown in FIG. 8, the source of the print job may be a computer, a scanner, a facsimile machine, a copier, or any other entity that generates a print job. As print jobs reach the top of queue 802, they are output 804 to printer 806, which prints the jobs. An indication that a print job has completed is output 808 from the printer 806 to the job history monitor 818, which stores a list of print jobs that have been completed. A reduced content image of each print job is created from print data 810 by reduced content image generator 814. The reduced content image or a pointer to the reduced content image is output 816 to the job history monitor 818 to be stored with the history information about each print job as generally discussed above with respect to status monitor 118, 422, and 614. Job history information, including a reduced content image representing each job, is output by output element 824, which may be a panel display, a connection to the world wide web, a connection to an intranet or other network, etc. The print data 810 used to create the reduced content image may be, as discussed above, any portion of the print data. For example, the printer 806 may be configured like printer 624, as shown in FIG. 7, and the print data 810 used to create the reduced content image may be print data (e.g., 626' in FIG. 7) that has not yet been processed by a raster image processor (e.g., 706 in FIG. 7) or print data (e.g., 626 in FIG. 7) that has been processed by a raster image processor.

Although specific embodiments and applications of the invention have been described in this specification, there is no intention that the invention be limited these exemplary embodiments and applications or to the manner in which the exemplary embodiments and applications operate or are described herein. For example, although the examples shown in FIGS. 4-8 illustrate printing systems, the invention is as applicable to other imaging systems as to printing systems. For example, the print generator 402 and 606 could be replaced with an entity for generating an image scanning process. The spooler/despooler subsystem 406 and printing device 416 in FIG. 4 and the printer 624 in FIG. 6 would then be replaced with a scanning engine that scans and stores an image. Status monitor 422 and 614 would monitor the status of the scan job, and reduced content image generator 410 and 630 would generate a reduced content image of the scanned data. Similarly, the queue 802 in FIG. 8 may queue requested scan jobs, and the printer 806 in FIG. 8 may be replaced with a scanning engine. As another example, the printing examples illustrates in FIGS. 4-8 may be replaced by examples in which, rather than a print job, a facsimile job, copy job, or document processing job is generated and processed, and status information regarding the job includes a reduced content image of the job.

The invention claimed is:

1. A method of monitoring an imaging job, said method comprising the steps of:
   generating an imaging job at a job generating stage, said imaging job comprising imaging data of a print job;
   extracting said imaging data from output of said job generating stage at said job generating stage before sending said imaging job to a printer or printing device;
   generating from said imaging data extracted from said job generating stage a first reduced content image representing a sub-portion of said imaging job at said job generating stage before sending said imaging job to said printer or printing device;
   storing said first reduced content image with information relating to said imaging job at a status monitor of said job generating stage;
   beginning processing of said imaging job at said printer or printing device while monitoring progress of processing of said imaging job by said printer or printing device;
   generating and storing a second reduced content image from said imaging data after processing of said imaging data;
   generating a completion notice at said printer or printing device signaling completion of processing of said sub-portion of said imaging job and forwarding said completion notice to said status monitor of said job generating stage; and
   displaying said completion notice at said job generating stage with said first reduced content image stored at said status monitor of said job generating stage.

2. The method of claim 1, wherein generating said first reduced content image comprises generating said first reduced content image at a job-generating computer from said imaging data before spooling and despooling of said imaging data.

3. The method of claim 1, wherein said imaging job comprises a printing job, and said imaging data comprises printing data in a first format.

4. The method of claim 3, wherein said processing step comprises converting said printing data into a second format.

5. The method of claim 1, wherein said information comprises a progress status of said imaging job.

6. The method of claim 1, wherein the sub-portion of said imaging job is a page of said imaging job.

7. The method of claim 1, wherein following completion of said imaging job, said information comprises a history of said job.

8. A non-transitory machine readable media comprising instructions for causing a machine to perform a method, said method comprising:
   receiving imaging data generated by said machine, said imaging data comprising an imaging job;
   generating from said imaging data a first reduced content image representing a sub-portion of said imaging job, wherein generating said first reduced content image representing said sub-portion of said imaging job occurs within said machine immediately after generation of said imaging data by said machine and prior to sending of said imaging data to a printer or printing device;
   outputting said first reduced content image to a storage device of said machine in which information relating to said imaging job is stored by a status monitor of said machine;
   beginning processing of said imaging job at said printer or printing device while monitoring progress of processing of said imaging job by said printer or printing device;
   generating a second reduced content image after processing said imaging data using said printer or printing device;
   outputting said second reduced content image to said storage device;
   generating a completion notice at said printer or printing device signaling completion of processing of said sub-portion of said imaging job and forwarding said completion notice to said status monitor of said machine; and
   displaying said completion notice at said machine with said first reduced content image stored at said storage device of said machine.

9. The machine readable media of claim 8, wherein said imaging job comprises a print job.

10. The machine readable media of claim 8, wherein said information indicates progress of execution of said imaging job.

11. The machine readable media of claim 8, wherein said information comprises a notice that said imaging job has been completed.

12. The machine readable media of claim 8, wherein said information comprises a notice that said imaging job has been partially completed.

13. A non-transitory machine readable media comprising instructions for causing a machine to perform a method, said method comprising:
- receiving imaging data generated by said machine, said imaging data comprising an imaging job;
- generating from said imaging data a first reduced content image representing a sub-portion of said imaging job, wherein generating said first reduced content image representing said sub-portion of said imaging job occurs within said machine immediately after generation of said imaging data by said machine and prior to sending of said imaging data to a printer or printing device;
- outputting said first reduced content image to a storage device of said machine in which information relating to said imaging job is stored by a status monitor of said machine;
- beginning processing of said imaging job at said printer or printing device while monitoring progress of processing of said imaging job by said printer or printing device;
- generating a second reduced content image at the time of processing said imaging data by said printer or printing device;
- outputting said second reduced content image to said storage device;
- generating a completion notice at said printer or printing device signaling completion of processing of said sub-portion of said imaging job and forwarding said completion notice to said status monitor of said machine; and
- displaying said completion notice at said machine with said first reduced content image stored at said storage device of said machine.

14. A method of monitoring a print job comprising:
- generating a print job at a job generating stage comprising a computer;
- extracting print data from the print job at the job generating stage;
- generating a first reduced content image representing a sub-portion of said print job at the job generating stage from the print data extracted at the job generating stage before the print job has been sent from the computer to a job processing stage comprising a printer or printing device;
- storing the first reduced content image with information relating to the print job at said job generating stage;
- beginning processing of said print job at said job processing stage while monitoring progress of processing by said job processing stage of said print job;
- extracting additional print data from the print job after at least some processing at the job processing stage;
- generating a second reduced content image from the additional print data; and
- storing the second reduced content image with the information relating to the print job;
- generating a completion notice at said job processing stage signaling completion of processing of said sub-portion of said print job and forwarding said completion notice from said job processing stage to said job generating stage; and
- displaying said completion notice at said job generating stage with said first reduced content image stored at said job generating stage.

15. A method as recited in claim 14, further comprising:
- displaying the first reduced content image prior to processing of the print job at the job processing stage; and
- displaying the second reduced content image after completion of the job processing stage.

16. A method as recited in claim 14, further comprising:
- displaying the first reduced content image prior to processing of the print job at the job processing stage; and
- displaying the second reduced content image after at least some processing at the job processing stage but before completion of the job processing stage.

17. A method as recited in claim 14, wherein the first and second reduced content images comprise thumbnail images.

18. A method as recited in claim 14, wherein the first reduced content image comprises a thumbnail image.

19. A method of monitoring an imaging job, said method comprising the steps of:
- generating an imaging job at a job generating stage, said imaging job comprising imaging data of a print job;
- extracting said imaging data from output of said job generating stage at said job generating stage before sending said imaging job to a printer or printing device;
- generating from said imaging data extracted from said job generating stage a first reduced content image representing a sub-portion of said imaging job at said job generating stage before sending said imaging job to said printer or printing device;
- storing said first reduced content image with information relating to said imaging job at a status monitor of said job generating stage;
- beginning processing of said imaging job at said printer or printing device while monitoring progress of processing of said imaging job by said printer or printing device;
- generating a second reduced content image from said imaging data after processing of said imaging data;
- storing said second reduced content image with said information relating to said imaging job at said status monitor of said job generating stage;
- generating a completion notice at said printer or printing device signaling completion of processing of said sub-portion of said imaging job and forwarding said completion notice to said status monitor of said job generating stage; and
- displaying said completion notice at said job generating stage with at least one of said first reduced content image and said second reduced content image stored at said status monitor of said job generating stage.

20. A method as recited in claim 19, wherein the completion notice is displayed with said first reduced content image.

21. A method as recited in claim 19, wherein the completion notice is displayed with said second reduced content image.

* * * * *